UNITED STATES PATENT OFFICE.

JOHANN SECUNDUS KRUSE, OF LONDON, ENGLAND.

ARTIFICIAL STONE OR LIKE COMPOSITION.

1,078,100.  Specification of Letters Patent.  Patented Nov. 11, 1913.

No Drawing.   Application filed May 27, 1911.  Serial No. 629,921.

*To all whom it may concern:*

Be it known that I, JOHANN SECUNDUS KRUSE, a subject of the German Emperor, and residing at 48 Elm Park Gardens, in the county of London, England, have invented certain new and useful Improvements in and Relating to Artificial Stone or like Compositions, of which the following is a specification.

This invention relates to the production of artificial stone compositions and has for its object to produce a composition of this kind with an enamel-like surface without furnacing for fine art and like purposes.

This invention consists in a body with an enamel like surface formed of an oxid of magnesium and a chlorid of magnesium together with sufficient of a gum or resinous body to give the desired surface.

The invention also consists in the improved compositions herein indicated.

In carrying the invention into effect in one form by way of example, I take three parts by weight of calcined magnesium oxid; four parts by weight of a solution of magnesium chlorid, and one part by weight of a gum solution.

The magnesium oxid to which I have referred is of a good quality of which 1 gram in weight equals 1.7 cubic centimeters in volume with moderate shaking that is of actual specific gravity about 3.

The magnesium chlorid solution is formed by dissolving magnesium chlorid crystals in just as much cold water as is sufficient for solution. With ordinary magnesium chlorid crystals about one part by weight of cold water is required for one part by weight of crystals but with specially pure and dry crystals two parts by weight of water may be required. This solution contains 410 grams of MgCl$_2$ per liter at 15° C.

The gum solution is a 25% solution of orange shellac dissolved in 90% alcohol to which a little lavender oil has been added.

The magnesium chlorid and gum solutions are mixed together and the magnesium oxid then carefully stirred in; or the magnesium oxid may be stirred in the chlorid solution and the gum solution subsequently added. By this means a mixture of the consistency of cream is obtained which is poured into molds and set at such a temperature that in a few days it forms a hard enamel an analysis of which shows it to be composed of approximately:—

| | |
|---|---|
| Hydrated oxychlorid of magnesium | 80.5% |
| Shellac resinate of magnesia | 4.5% |
| Moisture | 12.5% |
| Commercial impurity (calcium sulfate) | 2.5% |
| | 100.0 | some magnesium carbonate being formed as the enamel ages.

The mixture can be stirred almost to setting point or for some shorter time. The longer it is stirred provided the material is not actually set the more homogeneous the result, so that if a result be desired in which the upper surface is a little harder than the bulk of the mixture stirring should not be effected at so late a stage as if a homogeneous product be required. The result is a composition including the following substances in substantially the ratios mentioned, viz:—magnesium oxid (MgO) of density 3, 15 parts, magnesium chlorid (MgCl$_2$) 6 parts and shellac 1 part.

It may be explained that the reason for aiding a gum or like solution in the composition is that increase of the resistance quality of the enamel especially when the same is in thin pieces, is made possible. The gum further makes the enamel smoother and gives or improves the natural polish as well as fixing the colors or the like so that they will not rub off, so that a surface is obtained which improves by wear and retains marble or like patterns incorporated with the composition in its liquid or semi-liquid state.

It will be understood that the above example is given by way of illustration merely, and modifications may be made as desired, for example any suitable coloring matter may be incorporated with the mixture, and I find that this coloring is held firmly in the enamel and that it is not deteriorated by abrasion. Also other gums or resins may be employed such for example as gum mastic and any desired solvent used therefor but it will be understood that the proportions of the composition may require variation with different gums and with different amounts of color added or with different varieties of magnesium oxid although such can readily be determined by aiming at an effect as obtained with the composition set out above, but it is found that modifications for the best effect should only be made approximating to the formula given herein because large changes are very disadvantageous as will be understood from the following:—Magnesium oxid can be obtained commercially as a heavy oxid, a medium oxid, or a light oxid. The density of the heavy oxid reckoned in the same manner as that of the medium oxid may vary from 8 to 20 approximately. The medium is usually about 1.7 and the light about 0.3 to 0.4. The heavy oxid is far too expensive for practical purposes and does not give a better product than the medium: in fact, it is often worse. Again, the light oxid gives a product which is too chalky and more like that which would be obtained with plaster of Paris.

As regards the chlorid solution, the formula given herein uses 4 parts of this solution to 3 parts of the oxid. If a change be made as little as using 3 parts of the chlorid to 4 parts of the oxid, the result is greatly inferior: in fact, is practically no good. Again, if the quality of chlorid be increased to 5 parts of chlorid with 3 parts of oxid, the chlorid is in excess and oozes out through the pores of the mixture after setting.

With regard to the gums, about the same quantities of the gums are required whether shellac mastic, or sandarac be used, and although the quantity of these gums may be reduced, the same effect is not obtained and again, if the quantity be increased for instance to 2 parts of a 25% alcohol solution instead of one part the alcohol affects the magnesium chlorid solution and an inferior result is obtained.

Further, the oil of lavender or the like can be omitted if desired as it is not essential to the composition although when used its odor is retained for a considerable period.

By means of the present invention an enamel like composition is obtained which is cheap and without furnacing equals in hardness furnaced enamel of the opaque kind withstands atmospheric changes of heat, cold or damp and takes any desired shape during formation. It can be colored any shade also marbled or patterned in any desired way as by mixing with flakes or dust of any suitable kind such as metal, mother-of-pearl, mica, colored sands, or the like, which as with other objects it firmly holds giving effects not deteriorated by ordinary wear.

Although it has on its upper or exposed surface a substantially natural polish this can if desired be increased by slight rubbing or it may if desired be painted upon or gilded or polished as with wax, French or other polish or varnish and can be used for fine and small articles in fine art work, including Vernis Martin work.

An enamel like composition according to the present invention can be utilized for the formation of high class artistic tiles, panels or the like formed with or without a basis such as wood or metal. In this case flint or the like added to the mixture produces an artistic effect particularly suitable as a background when patterns are incorporated. It will be understood that this addition of flint to the mixture or the addition of colored sands, mica, metal or other bodies of the kind referred to above varies the surface of the mixture. With flint incorporated throughout the mass for instance the surface obtained is smooth but not so glossy as without flint, the change of surface depending on the quantity and fineness of flint used. With metal dust or bodies added to the surface only a smooth glossy surface is obtained broken up by the metal particles. Thus by suitably choosing the added bodies and the manner of adding any desired artistic effect can be produced.

It is also useful as a cement for tiles or other ornamental objects because the cement can appear where desired as an ornament or decoration in the finished work.

An enamel like composition according to the present invention can be inlaid or applied to substances such as wood, metal, stone, glass, earthenware, ivory, or leather for decorative purposes and can be used for mosaic work and cloisonné work and in all cases where translucent enamels are not essential.

Having now described my invention what I claim as new and desire to secure by Letters Patent is:—

1. A composition of matter consisting of three parts of magnesium oxid of approximate density 1.7 four parts of a cold aqueous saturated solution of magnesium chlorid and one part of a 25% alcoholic solution of shellac; as and for the purpose set forth.

2. An artificial stone or like composition comprising the following substances in the proportions specified, viz:—three parts of calcined magnesium oxid of an approximate density 1.7: about four parts of a cold aqueous saturated solution of magnesium chlorid and about one part of a 25% alcoholic solution of a resinous body; as set forth.

3. An artificial stone or like composition including the following substances in substantially the ratios (by weight) specified, viz:—magnesium oxid (MgO) of apparent density about 1.7, 15 parts, magnesium chlorid ($MgCl_2$) 6 parts and a resinous body 1 part.

4. An artificial stone or like composition including the following substances in substantially the ratios (by weight) specified, viz:—magnesium oxid (MgO) of apparent density about 1.7, 15 parts, magnesium chlorid ($MgCl_2$) 6 parts and shellac 1 part.

5. An artificial stone composition containing the following substances in substantially the proportions specified, viz:—hydrated oxychlorid of magnesium and a resinate of magnesia in about the proportion 20 to 1 by weight.

In testimony whereof, I affix my signature in presence of two witnesses.

JOHANN SECUNDUS KRUSE.

Witnesses:
  PERCY RAYNER SMITH,
  P. A. OUTHWAITE.